Figure 1:
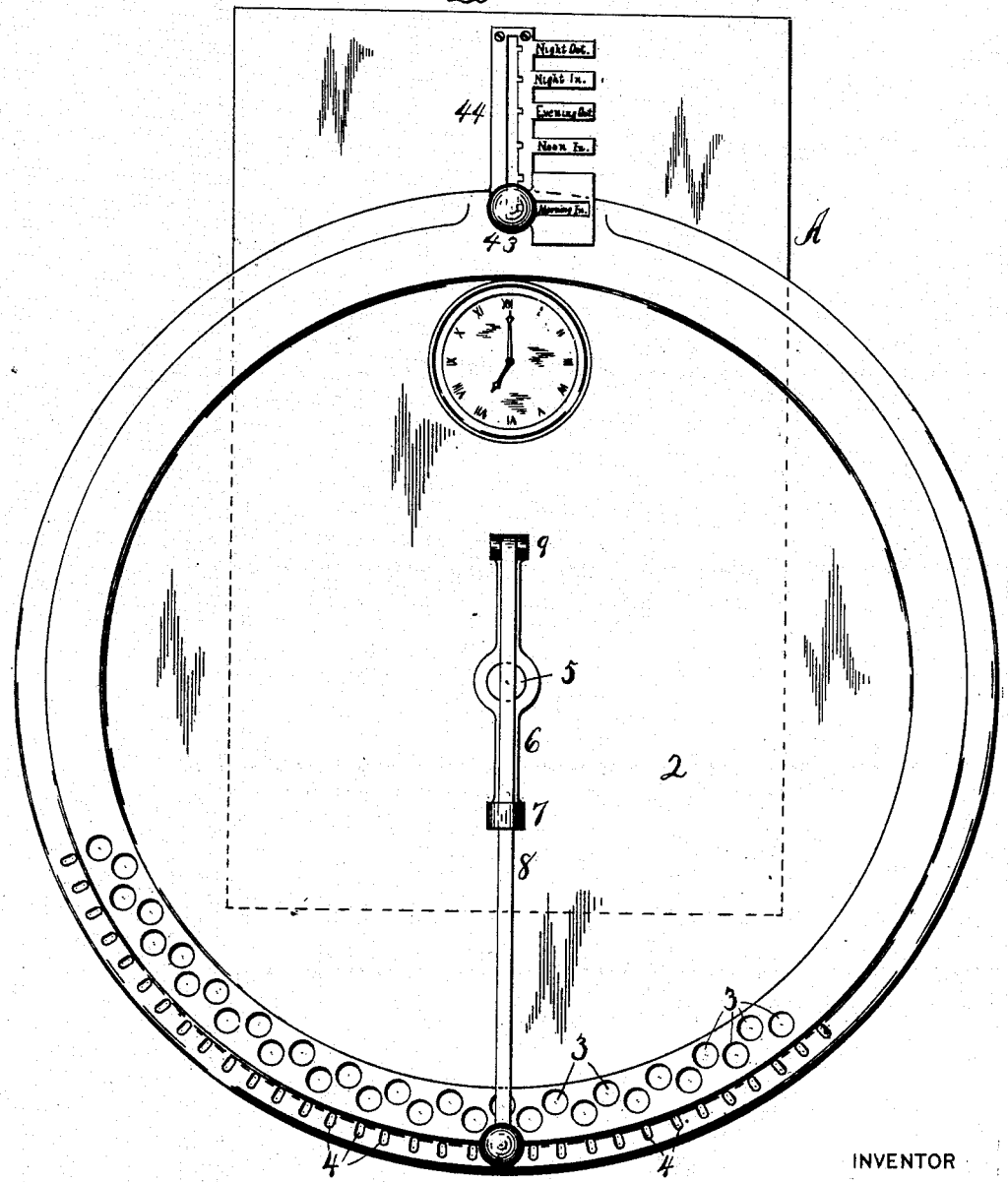

No. 675,659. Patented June 4, 1901.
W. W. KIMBALL.
WORKMAN'S TIME RECORDER.
(Application filed Apr. 4, 1898. Renewed Nov. 9, 1900.)

(No Model.) 8 Sheets—Sheet 2.

WITNESSES:
C. A. Schoeneck
Mary A. Franklin

INVENTOR
William W. Kimball
BY
Smith & Davidson
ATTORNEYS.

No. 675,659. Patented June 4, 1901.
W. W. KIMBALL.
WORKMAN'S TIME RECORDER.
(Application filed Apr. 4, 1898. Renewed Nov. 9, 1900.)

(No Model.) 8 Sheets—Sheet 3.

WITNESSES:
CL Schoeneck
Roy A. Franklin

INVENTOR
William W Kimball
BY
Smith & Denison
ATTORNEYS.

No. 675,659.

Patented June 4, 1901.

W. W. KIMBALL.
WORKMAN'S TIME RECORDER.
(Application filed Apr. 4, 1898. Renewed Nov. 9, 1900.)

(No Model.)

8 Sheets—Sheet 5.

WITNESSES:
CC Schoeneck
Mary A. Franklin

INVENTOR
William W. Kimball
BY
Smith & Denison
ATTORNEYS.

No. 675,659. W. W. KIMBALL. Patented June 4, 1901.
WORKMAN'S TIME RECORDER.
(Application filed Apr. 4, 1898. Renewed Nov. 9, 1900.)
(No Model.) 8 Sheets—Sheet 6.

WITNESSES:
CC Schoeneck
Mary A. Franklin

INVENTOR
BY William W. Kimball
Smith & Davidson
ATTORNEYS.

No. 675,659. Patented June 4, 1901.
W. W. KIMBALL.
WORKMAN'S TIME RECORDER.
(Application filed Apr. 4, 1898. Renewed Nov. 9, 1900.)
(No Model.) 8 Sheets—Sheet 7.
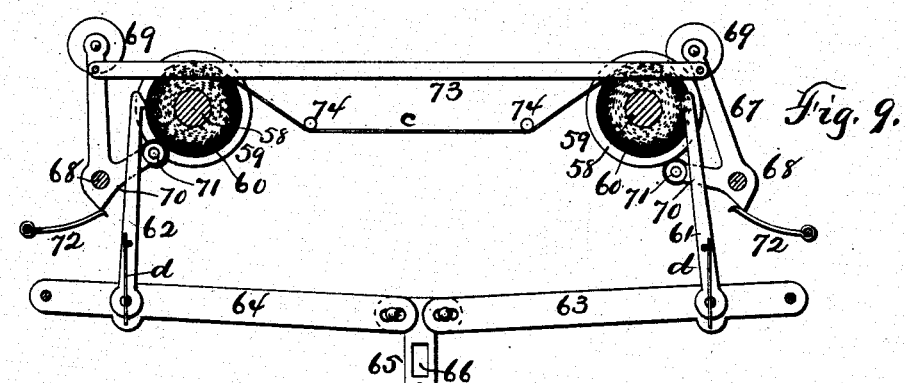
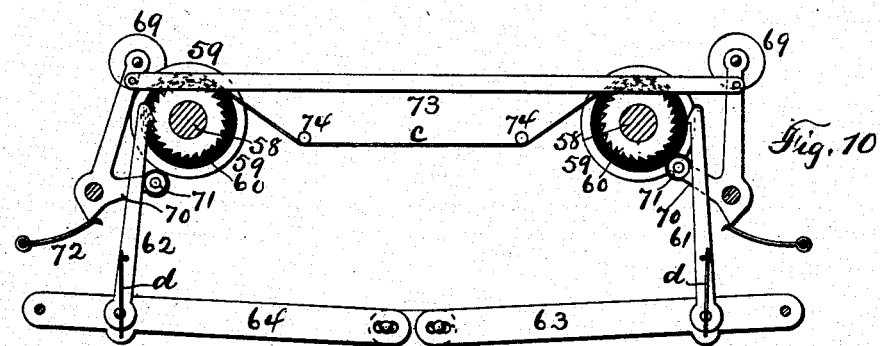
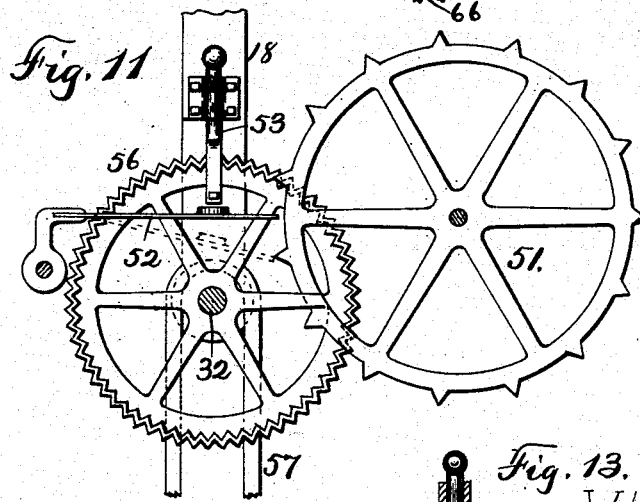
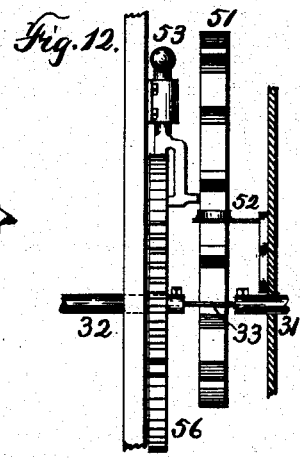
WITNESSES:
CC Schoeneck
INVENTOR
William W. Kimball
BY
Smith Davidson
ATTORNEYS.

No. 675,659. Patented June 4, 1901.
W. W. KIMBALL.
WORKMAN'S TIME RECORDER.
(Application filed Apr. 4, 1898. Renewed Nov. 9, 1900.)
(No Model.) 8 Sheets—Sheet 8.
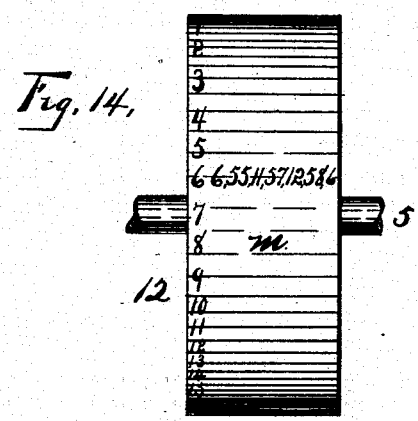
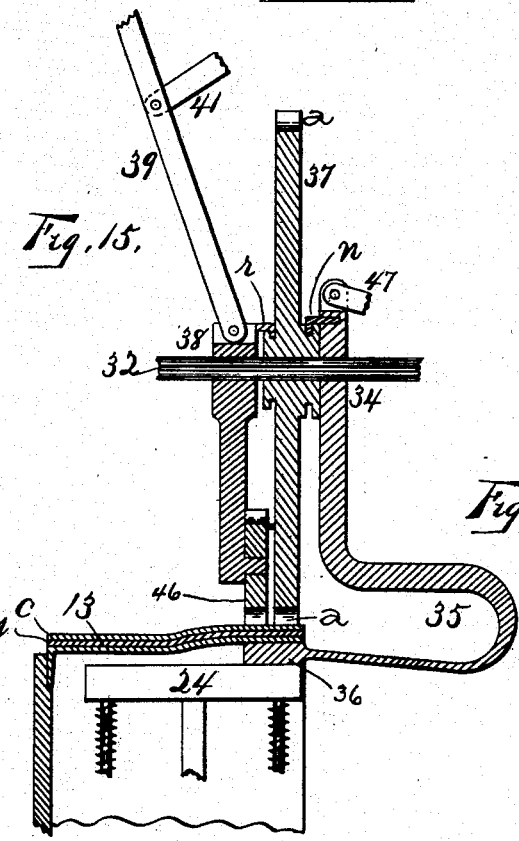
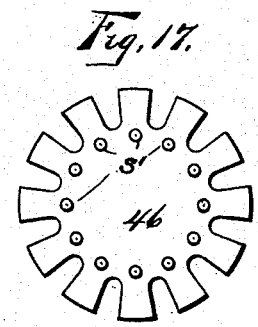
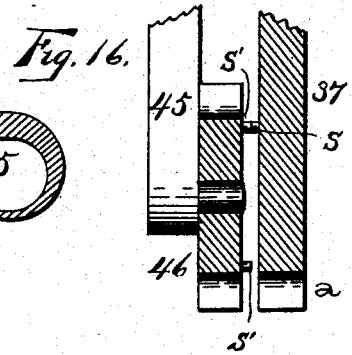
WITNESSES:
C. L. Schorneck
M. A. Franklin
INVENTOR
William W. Kimball
BY
Smith & Denison
his ATTORNEYS.

UNITED STATES PATENT OFFICE.

WILLIAM W. KIMBALL, OF SYRACUSE, NEW YORK, ASSIGNOR OF ONE-HALF TO JOHN H. COSTELLO, GEORGE S. HERRICK, AND EDWIN C. HALL, OF SAME PLACE.

WORKMAN'S TIME-RECORDER.

SPECIFICATION forming part of Letters Patent No. 675,659, dated June 4, 1901.

Application filed April 4, 1898. Renewed November 9, 1900. Serial No. 35,964. (No model.)

*To all whom it may concern:*

Be it known that I, WILLIAM W. KIMBALL, of Syracuse, in the county of Onondaga, in the State of New York, have invented new and useful Improvements in Workmen's Time-Recorders, of which the following, taken in connection with the accompanying drawings, is a full, clear, and exact description.

My invention relates to workmen's time-recorders of the class commonly known as "dial-machines," in which the workmen's designating-numerals are arranged in one or more circles concentric with a reciprocating plunger which when pushed in actuates a printing mechanism by which a workman's designating-numeral and the hour and minute are printed upon a paper strip.

My object is to provide a time-recorder of this class in which the minute-wheel is intermittently actuated and intermittently actuates the hour-wheel, in which the record-strip is placed upon a drum having a flexible face or rim, in which the impression mechanism is within said drum and exerts its force against a portion of said rim to force it outwardly to bring the paper and ribbon into positive engagement with the time-wheels to make an impression, in which an escapement is provided comprising a wheel-ratchet, a double-toothed pawl, and means to reciprocate said pawl, and embodying other novel features hereinafter described, and which are specifically set forth in the claims hereunto annexed.

It is constructed as follows, reference being had to the accompanying drawings, in which—

Figure 2:
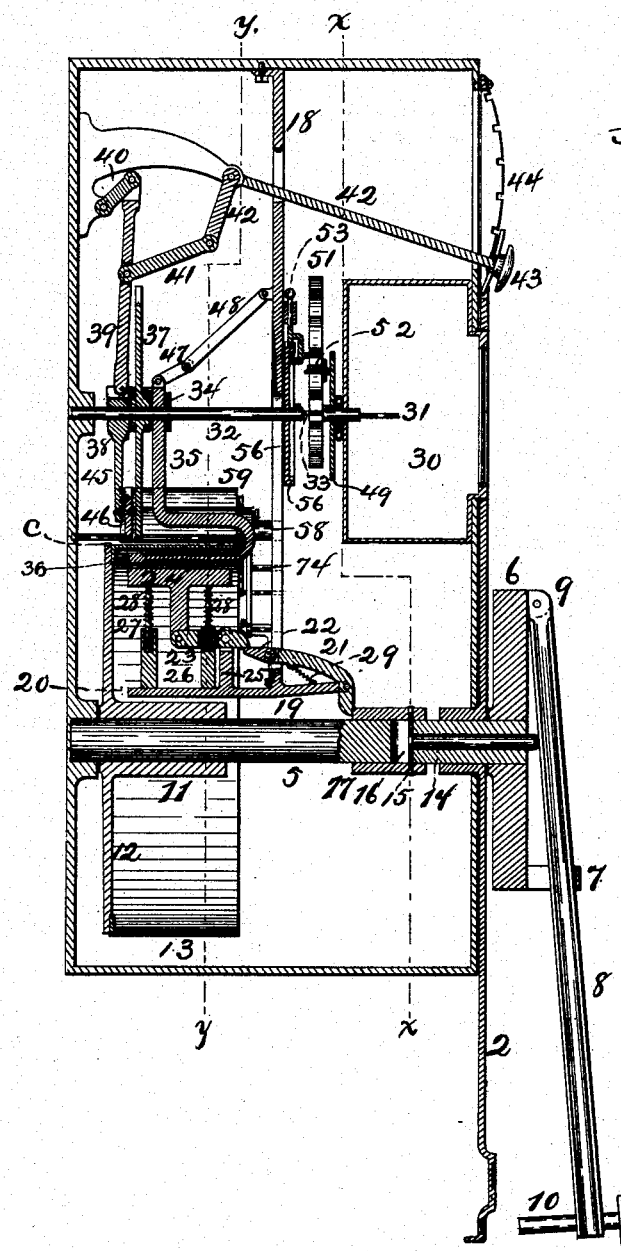
Figure 3:
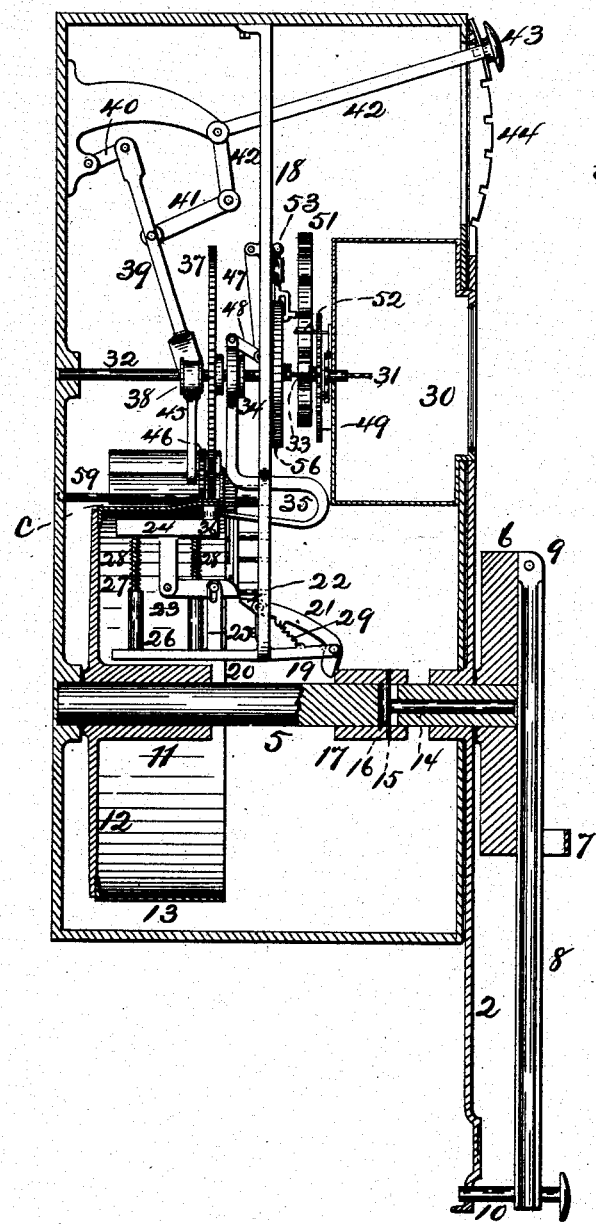
Figure 4:
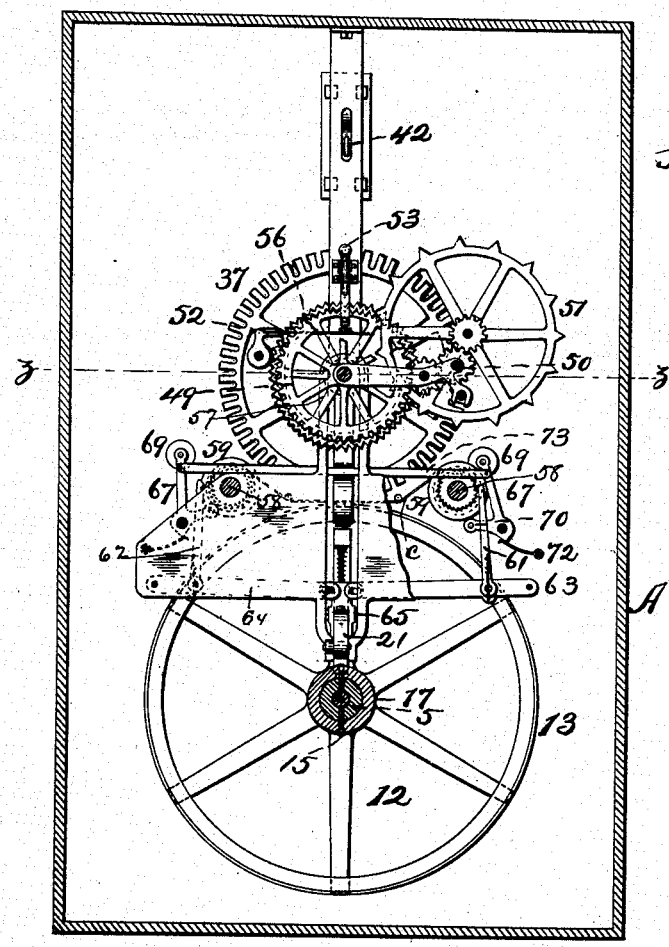
Figure 5:
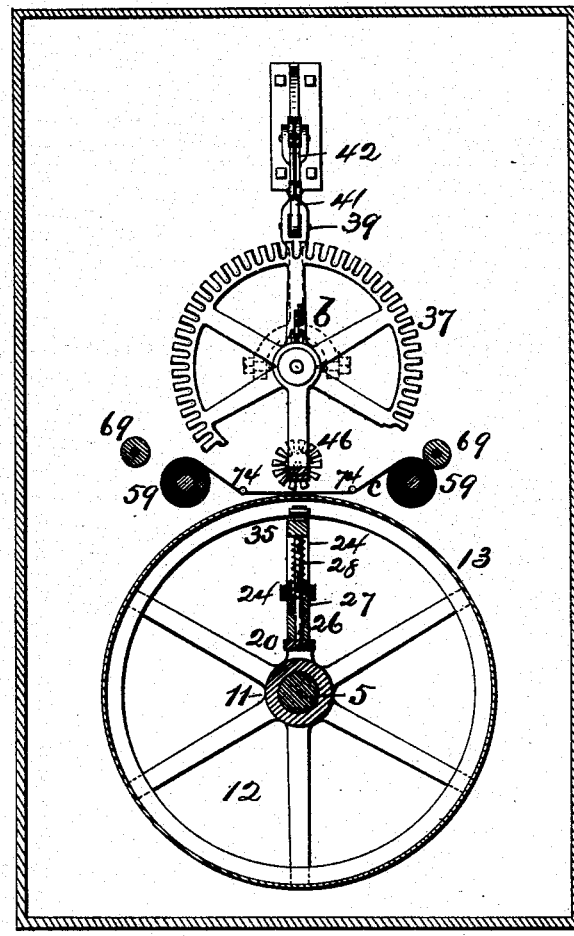
Figure 6:
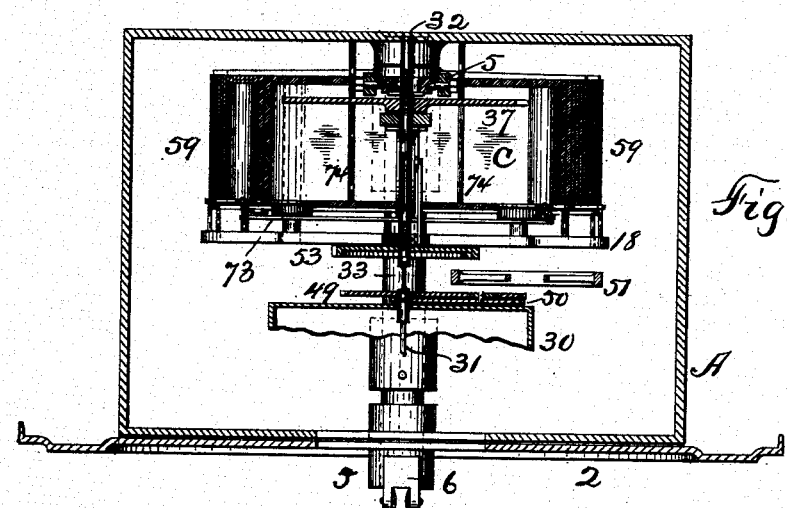
Figure 7:
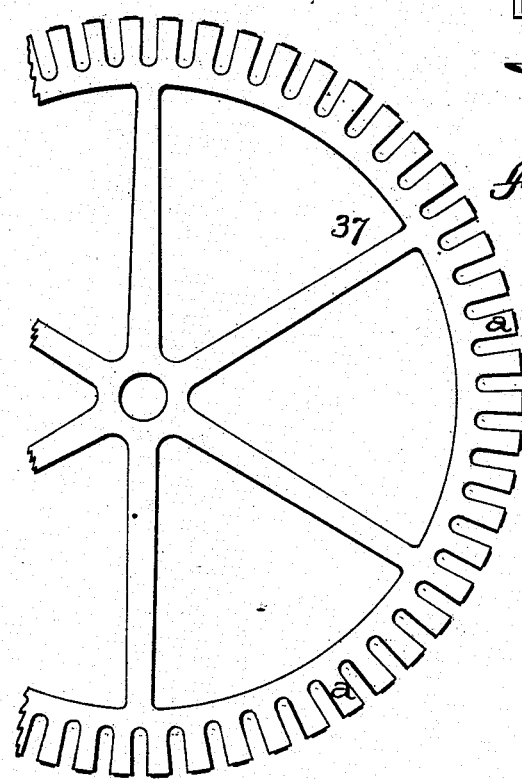
Figure 8:
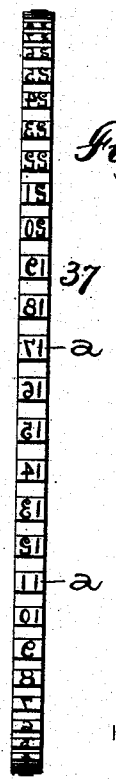

Figure 1 is a front elevation of the machine. Fig. 2 is a vertical section showing the printing mechanism in its normal position, as at "Morning in" in Fig. 1, ready for operation. Fig. 3 is a vertical section showing said mechanism shifted, as to "Night out," and the printing mechanism in the act of printing. Fig. 4 is a vertical section on line *x x* in Fig. 2. Fig. 5 is a like view on line *y y*, Fig. 2. Fig. 6 is a transverse section on line *z z* in Fig. 4. Fig. 7 is a side elevation, on an enlarged scale, of the minute-wheel. Fig. 8 is a front elevation of the same. Fig. 9 is an elevation of the ribbon-feed mechanism, showing the right-hand spool as the wind-up spool. Fig. 10 is a like view of the same, showing the left-hand spool as the wind-up spool. Fig. 11 is a front elevation of the minute-wheel intermittent-shift mechanism. Fig. 12 is a side elevation of the same. Fig. 13 is a detail of the double-toothed shifting and stop pawl of the minute-wheel mechanism. Fig. 14 is a front elevation of the drum and record-sheet thereon, showing a transverse daily record. Fig. 15 is a vertical section detailing the mounting and connection of the sleeves to the minute-wheel, the hour-wheel support, a pin device for intermittently rotating the hour-wheel, the record-drum, and presser-table. Fig. 16 is an enlarged sectional detail of the hour-wheel and part of the minute-wheel and the shifting device. Fig. 17 is a side elevation of the hour-wheel and its twelve pins or cogs.

A is a suitable case inclosing the works, and 2 is a stationary dial suitably mounted thereon, provided with one or more circular rows of workman's designating-numerals 3 and also with a row of guides, as openings 4. A shaft 5 is suitably journaled concentric with the dial, and 6 is a carrier suitably secured thereto, having a slotted arm 7, through which the workman's lever 8 (or impression-lever) is inserted, having one end suitably hinged to said lever, as at 9, and provided with a guide-pin 10, which is adapted to enter or suitably engage with any one of said guides to stop the swing of said lever and the rotation of said shaft. Upon this shaft a drum is secured in the form of a crown-wheel comprising a hub 11, a body 12, and a peripheral flange 13, of suitable flexible or elastic material, having one edge suitably secured to said body and having one side open, as shown in Figs. 2 and 3. Neither the shaft 5 or said drum have any movement, except to be rotated together; but said drum constitutes one form of an elastic or yielding support for a record-strip as one means for shifting it longitudinally. Upon this drum a record strip or sheet (see Figs. 14 and 15) is suitably secured or mounted removably, said strip being previously prepared with a marginal row of numerals to designate the workmen, said strip being so mounted on said drum that each numeral thereon will when brought upon the printing-line, as hereinafter described, be in coincidence with the like numeral upon the dial. In the outer end of this shaft 5 a plunger 14 is loosely inserted, its outer end being adapted to be engaged by the lever 8 and its inner end to engage with a bar 15 through a slot 16 in said shaft and secured in a sleeve 17 around it. A bar 18 is pendent from the top of said casing, its lower end being provided with front and rear lateral arms 19 and 20. Upon the arm 19 a lever 21 is suitably fulcrumed, having one end engaging with said sleeve and having a pawl 22 suitably mounted upon its other end to engage with an angular bar 23, upon which a presser-table 24 is suitably mounted. The bar 23 is suitably prevented from tilting or rocking, as by the slot-and-pin connection shown in Fig. 3, to an upright 25 upon the arm 20. Upon said arm tubular posts 26 are erected, and one of these is shown, Fig. 2, as passing upward through a suitable opening in the bar 23, and this affords an additional means for guiding said bar in its vertical reciprocation. Guide-rods 27 are mounted in said posts and secured to said table, and 28 is a suitable spring or springs to retract said table, rods, and bar to their normal positions after being raised by each inward movement of the lever 8, the spring 29 operating to retract the lever 21, sleeve, and pin to their normal positions, as in Fig. 2, when the lever 8 is swung outwardly, aided more or less by the springs 28.

A case 30 incloses a suitable clock-movement operating to drive a shaft 31, which is an extension of the minute-hand spindle and its rearward extension 32, which are suitably connected by a bar 33, upon which the shaft 31 may create more or less torsion. Upon this minute-wheel shaft 32 a sleeve 34 is suitably mounted, and an arm 35 is suitably connected, bent, and doubled back, substantially as shown, its free end being reduced in thickness to create a spring or otherwise adapted to yield or to be vibrated vertically and provided with an impression-head 36, which is in position to be engaged by the table 24 and sprung upward against the yielding rim 13 to force it locally upward. Upon this shaft 32 a minute-wheel 37 is splined or otherwise mounted to traverse it, and 38 is another sleeve loose upon said shaft, said sleeves being respectively connected to the hub of said wheel in any suitable manner which will permit the wheel to revolve independent of the sleeves, as by the angle-bar or hook-and-groove joints $n\,r$. Said minute-wheel is traversed upon said shaft by a mechanism comprising a lever 39, mounted upon said sleeve, and a link 40, a link 41 connecting said lever to a bell-crank 42, having an elongated arm, its outer end projecting through a slot and provided with a handle 43, adapted to detachably engage with one of a series of notches in a quadrant-rack and indicator 44 combined, said handle and rack being exterior to the casing. Each notch in the quadrant-rack indicates a fixed position of the minute-wheel for printing, as indicated in Fig. 1 by the labels, Figs. 1 and 2 showing it at "Morning in" and Fig. 3 at "Night out," the printing being done from left to right upon the paper strip upon the drum.

The head 36 is always in vertical alinement with the minute-wheel. The lower face of the minute-wheel is upon the printing-line, and the head upon the elastic impression-arm forces the elastic rim and paper record-strip upward into the plane of and against the time-wheels to make a time impression.

An arm 45 upon the sleeve 38 carries an arbor, upon which the hour-wheel 46, having twelve teeth, is mounted.

A pin $s$ projects from the side of the body or from a spoke of the minute-wheel in such position as once in each revolution of said wheel to engage with a like pin or stud $s'$, projecting from the adjacent side of the hour-wheel, and will remain in such engagement long enough to rotate the hour-wheel one space, and as each revolution of the minute-wheel represents one hour, so the hour-wheel is shifted hourly. This mechanism in itself is not a part of my invention and is only shown as illustrating an ordinary means for the intermittent hourly shift of the hour-wheel.

The minute-wheel is provided with sixty teeth $a$, each provided with a suitable minute-numeral, and the teeth of the hour-wheel are provided with suitable "hour-numerals." The dotted lines $b$ in Fig. 5 show one kind of a connection of the sleeve 38 to the minute-wheel, and there can be a like connection between the sleeve 34 and the minute-wheel, whereby both sleeves and said wheel and the impression-head are shifted together along the time-wheel shaft 32. The lever 39 also operates to prevent lateral swing of the hour-wheel, while the connected links 47 48 prevent lateral vibration of the impression-head.

A gear 49, Fig. 4, on the shaft 31 drives a train 50 to drive a minute trip-wheel 51, provided with pointed teeth, substantially as shown, which intermittently and successively engage with the spring-striker 52, Fig. 11, to deflect it, as shown by the dotted lines, and to permit it to spring upward when released to strike the pawl 53, which is mounted to be vertically reciprocated and is provided with two pawl-teeth 54 55, separated from each other, but in alinement vertically, the tooth 54 being normally in engagement with the outer teeth of the interior and exterior toothed crowned rack-wheel 56, secured on the shaft 32, so that when said striker throws said pawl 53 upward the tooth 54 will become disengaged and the tooth 55 will engage with the face of an inner tooth to wedge the wheel part of a space, and then as the pawl falls the tooth 54 will wedge the same the remainder of a space, and thus the minute-wheel is automatically shifted from one numeral to another.

As this escapement is applicable to other machines in which an intermittent automatic shift is desirable—as, for instance, in a typewriting machine—I do not limit myself to its use in or application to a time-recorder, but claim, broadly, an automatic escapement, comprising a crown-wheel provided with an interior and an exterior rack, a single double-toothed pawl, and means to vertically reciprocate said pawl.

The ink-ribbon is fed lengthwise and automatically reversed by the following mechanism, Figs. 4, 5, 6, 9, 10, and 11. A suitable frame is suspended or suitably supported in the casing, as by a yoke 57, suspended from the shaft 32 and having a suitable connection for steadiness upon or to the shaft 5 or to the bar 18, in which frame the ribbon-spool shafts or arbors 58 are suitably journaled on opposite ends of the printing-line and so as to carry the ribbon lengthwise to said printing-line. Each spool 59 or its shaft or arbor is provided with a suitable ratchet 60, 61 being a pawl to engage with one ratchet and 62 a pawl to engage with the other. These pawls are respectively mounted upon vertically oscillating or swinging bars 63 64, suitably pivoted at their outer ends and having their inner ends connected by slot-and-pin joints to a universal bar 65, which is mounted to be reciprocated by a slot-and-pin joint upon the bar 18 and mortised, as at 66, to permit the lever 21 to pass through it and engage with it to raise it when said lever is actuated. This (referring to Fig. 9) raising of the universal bar tilts the bar 63 and shifts the pawl 61 upward one tooth with the aid of the pawl-spring $d$, and then when the force is removed from said lever to permit its inner end to return it will draw said bar 63 down, carrying with it the dog 61, rotating that spool to wind the ribbon thereonto, and this imparts to or creates an automatic intermittent step-by-step lengthwise feed to the ribbon. A lever 67 is suitably mounted in the ribbon-frame, as upon a cross-bar or rock-shaft 68, carrying a follower-roller 69 and in or upon its arm 70 a pin or roller (or both) 71, which in Fig. 9 is out of engagement with the pawl 61, so that when the pawl 61 is in engagement with the ribbon the follower will travel upon the wound-up ribbon, and this will gradually create more and more tension upon the spring 72 until when a fixed point or "center" is passed. Then said spring will exert its force to throw this follower away from the ribbon by swinging the lever and bring the roller 71 against the pawl 61 to throw it away from the ratchet, and the parts will assume the position shown on the right in Fig. 10. This same movement will through the connecting-rod 73 oscillate the like mechanism on the left in Fig. 9 into engagement, as shown on the left in Fig. 10. The ribbon movement is then automatically reversed whenever the wound-up ribbon on one spool reaches a predetermined diameter. The ribbon $c$ is conducted or guided between the spools in any suitable manner, as by guides 74. The connecting-rod 73 regulates the position of the followers 69 and also that of the rollers 71 with reference to winding or unwinding ribbon in that as one follower 69 rolls upon the winding-up ribbon on one spool until when a given amount of ribbon has been wound onto that spool, as on the right in Fig. 9, the resultant outward movement of the lever 67 will bring the roller 71 into engagement with the pawl 61, in the meantime swinging the opposite lever inwardly, and thus permitting the pawl 62 to approach the ratchet and at the same time bringing the heel of the lever 67 (on the left in Fig. 9) onto the center, as to its spring 72, until when a fixed point is reached the operation of the pawl 61 will bring said parts past the center, and the spring 72 will then swing the lever 67 so as to release the pawl 62 to permit it to engage with its ratchet to rotate the spool on the left to wind up the ribbon from the other spool. Thus the alternate automatic oscillation of the levers 67, induced by the winding up of the ribbon on one spool, automatically reverses the lengthwise feed of the ribbon. The automatic outward movement of one follower-lever induces the inward movement of the other one, and inasmuch as this automatic ribbon-feed-reversing mechanism is applicable to other machines employing a lengthwise ribbon-feed, as type-writing machines, I do not limit myself to its use in or application to a time-recorder, but claim, broadly, an automatic ribbon-feed-reversing mechanism in which a lever engaging with the ribbon on one spool as it is being wound thereonto oscillates another lever to engage with the other spool, the oscillation of one lever inwardly throwing the other outwardly.

This machine is operated as follows: The clock is wound and the minute and hour wheels adjusted so that they indicate the same time on the printing-line as the hands on the clock-face. The shaft 31 and its extension 32, driven by the clock, revolve the minute-wheel, creating torsion on the bar 33 and driving the train 50. Fly 51 creates a torsion on 52, forcing it down, and which as it escapes from the tooth of the fly 51 springs up against the pawl 53, raises it, releasing rack 56 to be revolved one tooth by the torsion on 33, and revolving the shaft 32 enough to thus rotate the minute-wheel a distance representing a minute. This constitutes the intermittent minute-wheel shift once a minute. This rotation of the minute-wheel eventually brings it into engagement with the hour-wheel to shift it one space or from one hour to the next intermittently. In the morning the lever 42 is set at the lowest point in the rack 44, which indicates "Morning in," as in Figs. 1 and 2, thus shifting and setting the time-wheels and impression-head in the position shown in Fig. 2 with reference to the record-strip previously placed on the flexible rim 13 of the drum. A workman entering swings the lever 8 until the pin 10 is in proper relation to the opening 4 representing his numeral. He then presses the lever guided by said pin into said opening, forcing in the plunger 14, actuating the sleeve 17, lever 21, pawl 22, and angle-bar 23 to raise the table 24 up to flex the rim 13, forcing it up against the time-wheels and imprinting the hour and minute on the record-strip in alinement with his numeral thereon, the shifting of the lever 8 having turned the drum and strip to bring that numeral onto the printing-line, which is the same numeral represented by the opening which the pin 10 enters. Just before noon the lever 42 is shifted to the notch in the rack 44 representing "Going out," and each workman then records the time on the strip in the same manner as he did in the morning. By shifting the lever successively to the "Coming in" and "Night out" notches the records of the second entrance and departure of the workmen are recorded in the same way. In this manner the entire record of the time of each and every entrance and departure of a workman is recorded in a line across the strip in line with his numeral thereon. At night the strip is removed, showing the time-record of every workman in separate transverse lines across it for the entire day, and a new one put on for the next day.

Having described my invention, what I claim, and desire to secure by Letters Patent, is—

1. In a time-recorder, the combination with a clock-movement, its minute-spindle rearwardly extended, and an escapement intermittently operated by the rotation of said spindle, of a minute-wheel shaft released by said escapement to rotate intermittently, a minute-wheel upon and rotated by said shaft and an hour-wheel rotated intermittently at each full revolution of the minute-wheel, the faces of said wheels at a fixed point being in the same plane, and means to shift said minute-wheel upon said shaft.

2. In a time-recorder, the combination with a rotatable time-wheel shaft, a minute-wheel revolved thereby, and an hour-wheel driven by said minute-wheel, of a non-rotating sleeve upon said shaft, connected to said minute-wheel and means to traverse said sleeve upon said shaft and thereby shift said hour and minute wheels in a plane parallel to said shaft.

3. In a time-recorder, the combination with a revoluble shaft, of a drum mounted thereon for holding a record-strip, and comprising a hub, a rigid body, and a flexible rim secured at one edge to said body and standing at an angle thereto and constituting the periphery of said drum, and means to revolve said shaft in either direction, one side of said drum between said hub and rim being open.

4. In a time-recorder having a fixed printing line or plane, the combination with time-wheels having a portion of their faces in said plane, of a revoluble drum having a solid body and a flexible rim at an angle thereto upon which a record-strip is mounted, and means within said drum to flex a portion of said rim outwardly beyond its normal plane to bring said strip into said printing-plane and against the time-wheels to make an impression thereon.

5. In a time-recorder having a fixed printing-plane, the combination with time-wheels having their lower faces in said plane, of a drum having a flexible rim upon which a record-strip is mounted, and means to shift said time-wheels to vary their relation to said strip and rim upon a line transverse thereto.

6. In a time-recorder having a fixed printing-plane, the combination with a time-wheel shaft, and time-wheels mounted thereon or suspended therefrom, and means to traverse them upon said shaft, of a drum having a flexible rim upon which a record-strip is mounted, and means to expand said rim from within to bring a portion of said strip against said time-wheels in whatever position they may be to make an impression therefrom onto said strip.

7. In a time-recorder, the combination with time-wheels longitudinally movable upon a supporting-shaft, of an impression-head supported by the same shaft and movable with said wheels whereby it is always in the same vertical plane therewith, and means to force it against the back of a record-strip between it and said wheels, and bring a portion thereof against said wheels to receive an impression therefrom at any point upon a line widthwise thereof.

8. In a time-recorder, the combination with time-wheels longitudinally shiftable upon a supporting-shaft, a record-strip below said wheels and means to shift it longitudinally, of a head carried by a spring-arm pendent from said shaft and movable simultaneously with said time-wheels, and means to flex said arm to force said strip upwardly against said wheels to receive an impression therefrom.

9. In a time-recorder, the combination with the time-wheels and a revoluble drum having a flexible strip to carry a record-strip, of an impression mechanism within said drum comprising a head, a pressure-plate, and means to reciprocate said pressure-plate to force said head against the inner face of said rim whereby said record-strip is forced against said time-wheels to receive an impression therefrom.

10. In a time-recorder, the combination with the time-wheels, a shaft, a flexible drum thereon carrying a record-strip, of an impression-head within said drum, a pressure-plate adapted to engage with said head, a lever engaging with said drum, a sleeve upon said shaft engaging with said lever, and means to move said sleeve upon said shaft to actuate said lever, plate and head to force a portion of said drum elastically outward and make a record from said wheels upon said strip.

11. In a time-recorder, the combination with a dial provided with workmen's designating-numerals, a shaft central thereto, a lever upon said shaft and revolving it when shifted to register with any one of said numerals, and a flexible drum upon and revoluble with said shaft, carrying a record-strip, of an impression-head within said drum, a pressure-plate adapted to engage with said head, a lever engaging with said plate, a sleeve upon said shaft engaging with said lever, and a plunger in said shaft engaging with said sleeve and engaged by said lever to force said head against the rim inside of said record-strip and force said strip out of its normal plane and into that of said time-wheels.

12. In a time-recorder, the combination with a time-wheel shaft and time-wheels supported thereby, of a spaced rack upon the casing, a lever adapted to engage therewith, at any point, and intermediate connections whereby said time-wheels are shifted complementary to the position of said lever in said rack to vary their presentation at the printing-line of the machine.

13. In a workman's time-recorder, the combination with flexible support for a record-strip, a time-wheel shaft parallel thereto, time-wheels carried by said shaft above said strip, and an impression-head carried by said shaft and extending under said support, of a rack upon the casing of the machine, a lever engaging therewith at any desired point, an intermediate mechanism whereby said time-wheels and head are simultaneously shifted by said lever widthwise to said record-strip.

14. In a time-recorder, a revoluble drum for holding a record-strip, comprising a rigid body, and a flexible rim at an angle thereto unsupported except at the edge attached to said body, a shaft upon which it is mounted, and means to rotate it.

15. In a time-recorder, a suitable inclosing case, a stationary dial mounted thereon and provided with one or more circular rollers for designating-numerals, rollers or guides, a shaft 5 placed concentric with the dial, a carrier secured thereto and having a slotted arm 7, and a lever pivoted to the dial and passing through the slotted arm and provided with a guide-pin at its outer end, combined with the plunger 14 placed in one end of the shaft to which the carrier is secured, and which plunger is operated by the lever, a bar connected to one end of the plunger and passing through a slot in the shaft, a sleeve to which the rod is connected, and which has a reciprocating movement upon the shaft, a pendent bar 18 provided with the arms 19 and 20, a spring-actuated bent lever pivoted upon the arm 19 and operated by the sleeve, and provided at its inner end with a pawl; an angular bar pivoted in the slotted uprights, and which bar has its end to engage with the pawl, the presser-table connected to the inner end of the angular bar, spring-actuated rods for supporting the presser-table, and means, substantially as described, for printing the record in connection with the presser-table, substantially as shown.

16. A presser-table, spring-actuated rods for supporting it, suitable guides for the rods, an angular lever upon which the presser-table is pivoted, and which angular lever is journaled in the slotted uprights 25, an angular spring-actuated lever for operating the presser-table, and which lever is provided with a pawl at its inner end, combined with an endwise-moving mechanism which is operated by the operating-lever, whereby the table is raised whenever the record is to be made, substantially as described.

17. A shaft 32, operated by a clock mechanism, a sleeve 34 placed upon said shaft and adapted to be moved back and forth thereon, means for preventing the sleeve from having a movement upon said shaft, a curved arm provided with an impression-head to operate in connection with the recording mechanism, a minute-wheel also placed upon the shaft 32, and revolubly connected to the sleeve 34, and a second sleeve 38, provided with an arm 45 carrying an hour-wheel revolubly mounted upon the arm and operated by the minute-wheel, combined with a lever 39, the links 40, 41, and the angular lever 42, provided with a handle and a quadrant-rack and indicator; the handle upon the angular rod being adapted to engage with the notches in the rack, substantially as set forth.

18. The shaft 31 operated by the clock mechanism, the shaft 32, the plate 33 for connecting the shafts 31 and 32, the gear 49, secured to the shaft 31, a train of wheels operated by said gear 49, a minute trip-wheel operated by said gear, a spring-striker operated by said minute-wheel, a pawl provided with teeth operated by the spring-striker, the tooth-crowned rack-wheel 56 secured to the shaft 32, whereby the teeth are alternately disengaged and wedged, and the minute-wheel is automatically shifted from one numeral to another, substantially as specified.

19. The two spools 59, the ribbon wrapped thereon, a suitable frame in which the spools are journaled, the ratchets connected with the spools, spring-actuated pawls to engage the ratchets, vertically-oscillating bars upon which the pawls are mounted, universal slotted bar to which the inner ends of the swinging bars are loosely connected, and means for operating said universal bar, combined with the levers pivoted upon the rock-shafts, and each provided with a roller at its upper end, and an arm carrying a pin or roller; springs applied to the lower ends of the levers carrying the rollers, and a connecting-rod for connecting the levers, substantially as shown.

In witness whereof I have hereunto set my hand this 2d day of April, 1898.

WILLIAM W. KIMBALL.

In presence of—
MARY A. FRANKLIN,
HOWARD P. DENISON.